United States Patent Office 3,703,513
Patented Nov. 21, 1972

3,703,513
NOVEL 3,5-DIOXOPYRAZOLIDINE
DERIVATIVES
Hisao Yamamoto and Shin-Ichi Kaneko, Nishinomiya-shi, Japan, assignors to Sumitomo Chemical Company, Ltd., Osaka, Japan
No Drawing. Filed July 24, 1969, Ser. No. 844,610
Claims priority, application Japan, Aug. 2, 1968, 43/55,051; Aug. 14, 1968, 43/58,154; Nov. 27, 1968, 43/87,107; Dec. 17, 1968, 43/92,820, 43/92,821
Int. Cl. C07d 49/04
U.S. Cl. 260—240 D                    3 Claims

ABSTRACT OF THE DISCLOSURE

Novel 3,5-dioxopyrazolidine derivatives, having excellent anti-inflammatory effect and represented by the Formula I,

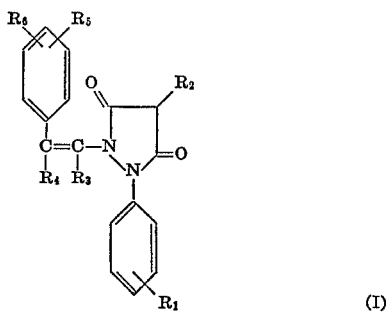

(I)

wherein $R_1$ signifies a hydrogen atom, a halogen atom, a nitro group, a lower alkyl group, a lower alkoxy group; $R_2$ signifies an alkyl group having up to 6 carbon atoms; $R_3$ and $R_4$ each signifies a hydrogen atom, a lower alkyl group, a phenyl group or a substituted phenyl group; $R_5$ and $R_6$ each signifies a hydrogen atom, a halogen atom, a nitro group, a lower alkyl group, a lower alkoxy group, a halogenated alkyl group or an alkylated amino group; provided that $R_5$ and $R_6$ may form an optionally 5- or 6-membered heterocyclic ring together with the adjacent phenyl group, are produced by contacting a phenylhydrazone derivative represented by the Formula II,

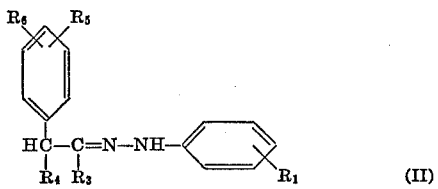

(II)

wherein $R_1$, $R_3$, $R_4$, $R_5$ and $R_6$ are as defined above with a malonic acid derivative represented by the Formula III,

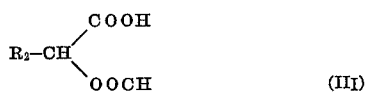

(III)

wherein $R_2$ is as defined above or its reactive derivatives or reacting the phenylhydrazone derivative of the Formula II with an organic acid of the Formula IV $$R_7COOH \qquad (IV)$$

wherein $R_7$ represents an alkyl group having up to 3 carbon atoms, or its reactive derivative, and then contacting the resulting $N^1,N^2$-diacylphenylhydrazine derivative of the Formula V,

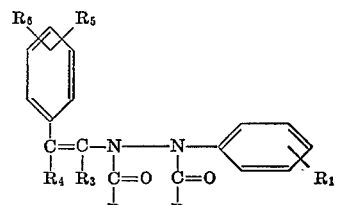

(V)

wherein $R_1$, $R_3$, $R_4$, $R_5$, $R_6$ and $R_7$ are as defined above, with a malonic acid derivative of the Formula III.

---

This invention relates to a novel process for producing 3,5-dioxopyrazolidine derivatives. More particularly, the invention pertains to a novel process for preparing 3,5-dioxopyrazolidine derivatives which are excellent in anti-inflammatory action and represented by the formula,

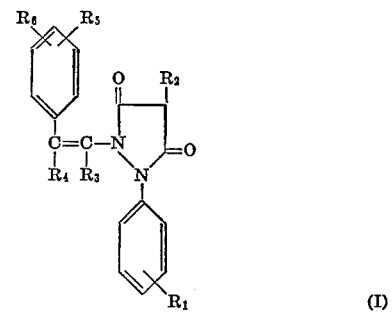

(I)

wherein $R_1$ signifies a hydrogen atom, a halogen atom, a nitro group, a lower alkyl group, a lower alkoxy group; $R_2$ signifies an alkyl group having 1 to 6 carbon atoms; $R_3$ and $R_4$ each signifies a hydrogen atom, a lower alkyl group, a phenyl group, or a substituted phenyl group; $R_5$ and $R_6$ each signifies a hydrogen atom, a halogen atom, a nitro group, a lower alkyl group, a lower alkoxy group, a halogenated alkyl group, or an alkylated amino group; provided that $R_5$ and $R_6$ may form an optionally 5- or 6-membered heterocyclic ring together with the adjacent phenyl group.

In the compound represented by the aforesaid Formula I, the halogen atom includes chlorine, bromine, iodine and fluorine atoms; the alkyl group includes straight chain or branched-chain groups; the lower alkyl group includes, for example, methyl, ethyl, n-propyl, iso-propyl, n-butyl and tertiary butyl groups; the lower alkoxy group includes, for example, methoxy, ethoxy, n-propoxy, isopropoxy, n-butoxy and tertiary butoxy groups; and the halogenated alkyl group is preferably a trifluoromethyl group, for example. $R_2$ represents a straight chain or branched-chain alkyl group having 1–6 carbon atoms, and includes, for example, methyl, ethyl, n-propyl, isopropyl, n-butyl, isobutyl, n-amyl, isoamyl, and n-hexyl groups, and n-propyl, n-butyl or n-amyl group is most preferable. In the case $R_5$ and $R_6$ form a heterocyclic ring condensed with the phenyl group, the heterocyclic group is, for example, methylene-dioxy group.

The present invention is further concerned with a process for producing 3,5-dioxopyrazolidine derivatives of the Formula I by contacting a phenyl hydrazone derivative represented by the formula,

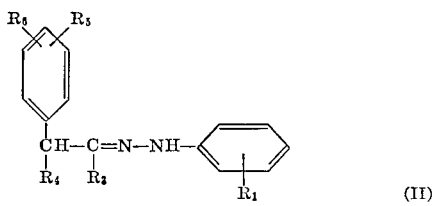

wherein $R_1$, $R_3$, $R_4$, $R_5$ and $R_6$ are as defined above in the Formula I, with a malonic acid derivative having the formula,

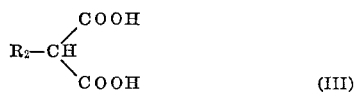

wherein $R_2$ is as defined above, or its reactive derivative. And further, the present invention is concerned with a process for producing 3,5-dioxopyrazolidine derivatives of the Formula I by reacting the phenylhydrazone derivatives of the Formula II with an organic acid of the formula, $$R_7COOH \qquad (IV)$$

wherein $R_7$ represents an alkyl group having up to 3 carbon atoms, or its reactive derivative, and then contacting the resulting $N^1,N^2$-diacyl phenylhydrazine derivative of the formula,

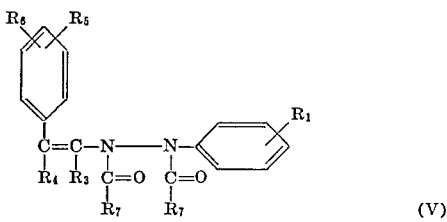

wherein $R_1$, $R_3$, $R_4$, $R_5$, $R_6$ and $R_7$ are as defined above; with a malonic acid derivative of the Formula III.

In accordance with the present invention, the process producing 3,5 - dioxopyrazolidine derivatives of the Formula I may be shown by the following reaction schema;

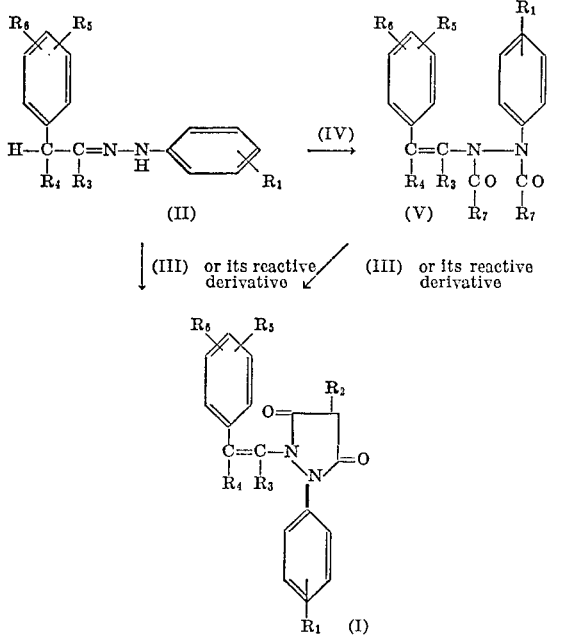

All of these processes proceed smoothly and give the objective products in high yields, and therefore these procedures are quite advantageous, in practice.

An object of the present invention is to provide a novel process for preparing 3,5-dioxopyrazolidine derivatives of the formula I.

The process of the present invention is carried out in being accompanied with migration of a double bond of a hydrazone derivative to 3,5-dioxo pyrazolidine derivative. The migration of a double bond of the hydrazone and acylation of $N^1$- and $N^2$-positions of the hydrazone derivative may proceed at the same time, and the reaction method is novel and has not heretofore been described in any other literature.

These 3,5-dioxopyrazolidine derivatives of the Formula I, according to this invention, may be prepared by reacting phenylhydrazone derivatives of the Formula II with malonic acid derivatives of the Formula III, or their reactive derivatives such as, for example, alkyl esters, acid halides, mixed acid anhydrides, preferably in the presence of an appropriate agent. These agents for acylation include, for example, sodium methoxide, sodium ethoxide, potassium ethoxide, potassium tertiary butoxide, sodium amide, potassium amide and the like, and sodium ethoxide or sodium methoxide is preferable for this reaction. The agent is used in the stoichiometric amount or more. Benzene, toluene, xylene, dioxane and the like are used as solvents in these reactions, but a solvent having lower boiling point may be preferably changed to an other solvent having a higher boiling point by distillation in order to complete the reaction in a shorter time. The reaction temperature is within the range of a room temperature to the boiling point of the solvent, preferably 80°–150° C.

After completion of reaction, the aftertreatment may be readily carried out. The reaction mixture is extracted with an appropriate solvent after acidifying with aqueous mineral acid, and the solvent is removed to dryness, and then the desired 3,5-dioxopyrazolidine derivative may be isolated as crude product. This product is further purified, if desired, by recrystallization from a suitable solvent such as ethanol, benzene or the like.

According to the process of the present invention, there are produced such 3,5-dioxopyrazolidine derivatives as shown below.

1-phenyl-2-styryl-4-n-butyl-3,5-dioxopyrazolidine
1-phenyl-2-styryl-4-n-pentyl-3,5-dioxopyrazolidine
1-phenyl-2-styryl-4-isobutyl-3,5-dioxopyrazolidine
1-phenyl-2-styryl-4-n-propyl-3,5-dioxopyrazolidine
1-(p-tolyl)-2-styryl-4-n-butyl-3,5-dioxopyrazolidine
1-(p-chlorophenyl)-2-styryl-4-n-butyl-3,5-dioxopyrazolidine
1-(p-methoxyphenyl)-2-styryl-4-n-butyl-3,5-dioxopyrazolidine
1-phenyl-2-(p-chlorostyryl)-4-n-butyl-3,5-dioxopyrazolidine
1-phenyl-2-(p-methylstyryl)-4-n-butyl-3,5-dioxopyrazolidine
1-phenyl-2-(p-methoxystyryl)-4-n-butyl-3,5-dioxopyrazolidine
1-phenyl-2-(α-methylstyryl)-4-n-butyl-3,5-dioxopyrazolidine
1-phenyl-2-(β-methylstyryl)-4-n-butyl-3,5-dioxopyrazolidine
1-phenyl-2-(α,β-dimethylstyryl)-4-n-butyl-3,5-dioxopyrazolidine
1-phenyl-2-(m-chlorostyryl)-4-n-butyl-3,5-dioxopyrazolidine
1-phenyl-2-(o-chlorostyryl)-4-n-butyl-3,5-dioxopyrazolidine
1-phenyl-2-(m-methylstyryl)-4-n-butyl-3,5-dioxopyrazolidine
1-phenyl-2-(o-methylstyryl)-4-n-butyl-3,5-dioxopyrazolidine
1-phenyl-2-(p-methylstyryl)-4-n-propyl-3,5-dioxopyrazolidine
1-phenyl-2-(p-methylstyryl)-4-n-pentyl-3,5-dioxopyrazolidine 1-phenyl-2-(o-methoxystyryl)-4-n-butyl-3,5-dioxopyrazolidine
1-phenyl-2-(p-isopropylstyryl)-4-n-butyl-3,5-dioxopyrazolidine
1-phenyl-2-(p-isopropylstyryl)-4-n-propyl-3,5-dioxopyrazolidine
1-phenyl-2-(p-nitrostyryl)-4-n-butyl-3,5-dioxopyrazolidine
1-phenyl-2-(p-ethylstyryl)-4-n-butyl-3,5-dioxopyrazolidine
1-p-tolyl-2-(p-chlorostyryl)-4-butyl-3,5-dioxopyrazolidine
1-p-tolyl-2-(p-methylstyryl)-4-n-butyl-3,5-dioxopyrazolidine
1-p-tolyl-2-(p-methoxystyryl)-4-n-butyl-3,5-dioxopyrazolidine
1-p-tolyl-2-(α-methylstyryl)-4-n-butyl-3,5-dioxopyrazolidine
1-p-tolyl-2-(β-methylstyryl)-4-n-butyl-3,5-dioxopyrazolidine
1-p-tolyl-2-(α,β-dimethylstyryl)-4-n-butyl-3,5-dioxopyrazolidine
1-p-tolyl-2-(m-chlorostyryl)-4-n-butyl-3,5-dioxopyrazolidine
1-p-tolyl-2-(o-chlorostyryl)-4-n-butyl-3,5-dioxopyrazolidine
1-p-tolyl-2-(m-methylstyryl)-4-n-butyl-3,5-dioxopyrazolidine
1-p-tolyl-2-(o-methylstyryl)-4-n-butyl-3,5-dioxopyrazolidine
1-p-tolyl-2-(p-methylstyryl)-4-n-propyl-3,5-dioxopyrazolidine
1-p-tolyl-2-(p-methylstyryl)-4-n-pentyl-3,5-dioxopyrazolidine
1-p-tolyl-2-(o-methoxystyryl)-4-n-butyl-3,5-dioxopyrazolidine
1-p-tolyl-2-(p-isopropylstyryl)-4-n-butyl-3,5-dioxopyrazolidine
1-p-tolyl-2-(p-isopropylstyryl)-4-n-propyl-3,5-dioxopyrazolidine
1-p-tolyl-2-(p-nitrostyryl)-4-n-butyl-3,5-dioxopyrazolidine
1-p-tolyl-2-(p-ethylstyryl)-4-n-butyl-3,5-dioxopyrazolidine
1-(p-chlorophenyl)-2-(p-chlorostyryl)-4-n-butyl-3,5-dioxopyrazolidine
1-(p-chlorophenyl)-2-(p-methylstyryl)-4-n-butyl-3,5-dioxopyrazolidine
1-(p-chlorophenyl)-2-(p-methoxystyryl)-4-n-butyl-3,5-dioxopyrazolidine
1-(p-chlorophenyl)-2-(α-methylstyryl)-4-n-butyl-3,5-dioxopyrazolidine
1-(p-chlorophenyl)-2-(β-methylstyryl)-4-n-butyl-3,5-dioxopyrazolidine
1-(p-chlorophenyl)-2-(α,β-dimethylstyryl)-4-n-butyl-3,5-dioxopyrazolidine
1-(p-chlorophenyl)-2-(m-chlorostyryl)-4-n-butyl-3,5-dioxopyrazolidine
1-(p-chlorophenyl)-2-(o-chlorostyryl)-4-n-butyl-3,5-dioxopyrazolidine
1-(p-chlorophenyl)-2-(m-methylstyryl)-4-n-butyl-3,5-dioxopyrazolidine
1-(p-chlorophenyl)-2-(o-methylstyryl)-4-n-butyl-3,5-dioxopyrazolidine
1-(p-chlorophenyl)-2-(p-methylstyryl)-4-n-propyl-3,5-dioxopyrazolidine
1-(p-chlorophenyl)-2-(p-methylstyryl)-4-n-pentyl-3,5-dioxopyrazolidine
1-(p-chlorophenyl)-2-(o-methoxystyryl)-4-n-butyl-3,5-dioxopyrazolidine
1-(p-chlorophenyl)-2-(p-isopropylstyryl)-4-n-butyl-3,5-dioxopyrazolidine
1-(p-chlorophenyl)-2-(p-isopropylstyryl)-4-n-propyl-3,5-dioxopyrazolidine
1-(p-chlorophenyl)-2-(p-nitrostyryl)-4-n-butyl-3,5-dioxopyrazolidine
1-(p-chlorophenyl)-2-(p-ethylstyryl)-4-n-butyl-3,5-dioxopyrazolidine
1-(p-methoxyphenyl)-2-(p-chlorostyryl)-4-n-butyl-3,5-dioxopyrazolidine
1-(p-methoxyphenyl)-2-(p-methylstyryl)-4-n-butyl-3,5-dioxopyrazolidine
1-(p-methoxyphenyl)-2-(p-methoxystyryl)-4-n-butyl-3,5-dioxopyrazolidine
1-(p-methoxyphenyl)-2-(α-methylstyryl)-4-n-butyl-3,5-dioxopyrazolidine
1-(p-methoxyphenyl)-2-(β-methylstyryl)-4-n-butyl-3,5-dioxopyrazolidine
1-(p-methoxyphenyl)-2-(α,β-dimethylstyryl)-4-n-butyl-3,5-dioxopyrazolidine
1-(p-methoxyphenyl)-2-(m-chlorostyryl)-4-n-butyl-3,5-dioxopyrazolidine
1-(p-methoxyphenyl)-2-(o-chlorostyryl)-4-n-butyl-3,5-dioxopyrazolidine
1-(p-methoxyphenyl)-2-(m-methylstyryl)-4-n-butyl-3,5-dioxopyrazolidine
1-(p-methoxyphenyl)-2-(o-methylstyryl)-4-n-butyl-3,5-dioxopyrazolidine
1-(p-methoxyphenyl)-2-(p-methylstyryl)-4-n-propyl-3,5-dioxopyrazolidine
1-(p-methoxyphenyl)-2-(p-methylstyryl)-4-n-pentyl-3,5-dioxopyrazolidine
1-(p-methoxyphenyl)-2-(o-methoxystyryl)-4-n-butyl-3,5-dioxopyrazolidine
1-(p-methoxyphenyl)-2-(p-isopropylstyryl)-4-n-butyl-3,5-dioxopyrazolidine
1-(p-methoxyphenyl)-2-(p-isopropylstyryl)-4-n-propyl-3,5-dioxopyrazolidine
1-(p-methoxyphenyl)-2-(p-nitrostyryl)-4-n-butyl-3,5-dioxopyrazolidine
1-(p-methoxyphenyl)-2-(p-ethylstyryl)-4-n-butyl-3,5-dioxopyrazolidine
1-(p-nitrophenyl)-2-(p-chlorostyryl)-4-n-butyl-3,5-dioxopyrazolidine
1-(p-nitrophenyl)-2-(p-methylstyryl)-4-n-butyl-3,5-dioxopyrazolidine
1-(p-nitrophenyl)-2-(p-methoxystyryl)-4-n-butyl-3,5-dioxopyrazolidine
1-(p-nitrophenyl)-2-(α-methylstyryl)-4-n-butyl-3,5-dioxopyrazolidine
1-(p-nitrophenyl)-2-(β-methylstyryl)-4-n-butyl-3,5-dioxopyrazolidine
1-(p-nitrophenyl)-2-(α,β-dimethylstyryl)-4-n-butyl-3,5-dioxopyrazolidine
1-(p-nitrophenyl)-2-(m-chlorostyryl)-4-n-butyl-3,5-dioxopyrazolidine
1-(p-nitrophenyl)-2-(o-chlorostyryl)-4-n-butyl-3,5-dioxopyrazolidine
1-(p-nitrophenyl)-2-(m-methylstyryl)-4-n-butyl-3,5-dioxopyrazolidine
1-(p-nitrophenyl)-2-(o-methylstyryl)-4-n-butyl-3,5-dioxopyrazolidine
1-(p-nitrophenyl)-2-(p-methylstyryl)-4-n-propyl-3,5-dioxopyrazolidine
1-(p-nitrophenyl)-2-(p-methylstyryl)-4-n-pentyl-3,5-dioxopyrazolidine
1-(p-nitrophenyl)-2-(o-methoxystyryl)-4-n-butyl-3,5-dioxopyrazolidine
1-(p-nitrophenyl)-2-(p-isopropylstyryl)-4-n-butyl-3,5-dioxopyrazolidine
1-(p-nitrophenyl)-2-(p-isopropylstyryl)-4-n-propyl-3,5-dioxopyrazolidine
1-(p-nitrophenyl)-2-(p-nitrostyryl)-4-n-butyl-3,5-dioxopyrazolidine
1-(p-nitrophenyl)-2-(p-ethylstyryl)-4-n-butyl-3,5-dioxopyrazolidine
1-phenyl-2-(3',4'-methylenedioxystyryl)-4-n-butyl-3,5-dioxopyrazolidine 1-phenyl-2-(3',4'-methylenedioxystyryl)-4-n-propyl-3,5-dioxopyrazolidine
1-phenyl-2-(3',4'-dimethoxystyryl)-4-n-butyl-3,5-dioxopyrazolidine
1-phenyl-2-(3',4'-dimethoxystyryl)-4-n-propyl-3,5-dioxopyrazolidine
1-phenyl-2-(3',4'-dimethylstyryl)-4-n-butyl-3,5-dioxopyrazolidine
1-phenyl-2-(3',4'-dimethylstyryl)-4-n-propyl-3,5-dioxopyrazolidine
1-phenyl-2-(2'-methoxy-3'-methylstyryl)-4-n-butyl-3,5-dioxopyrazolidine
1-phenyl-2-(2'-methoxy-3'-methylstyryl)-4-n-propyl-3,5-dioxopyrazolidine
1-phenyl-2-(2'-methoxy-5'-methylstyryl)-4-n-butyl-3,5-dioxopyrazolidine
1-phenyl-2-(2'-methoxy-5'-methylstyryl)-4-n-propyl-3,5-dioxopyrazolidine
1-phenyl-2-(3',4',5'-trimethoxystyryl)-4-n-butyl-3,5-dioxopyrazolidine
1-phenyl-2-(3',4',5'-trimethoxystyryl)-4-n-propyl-3,5-dioxopyrazolidine
1-p-tolyl-2-(3',4'-methylenedioxystyryl)-4-n-butyl-3,5-dioxopyrazolidine
1-p-tolyl-2-(3',4'-methylenedioxystyryl)-4-n-propyl-3,5-dioxopyrazolidine
1-p-tolyl-2-(3',4'-dimethoxystyryl)-4-n-butyl-3,5-dioxopyrazolidine
1-p-tolyl-2-(3',4'-dimethoxystyryl)-4-n-propyl-3,5-dioxopyrazolidine
1-p-tolyl-2-(3',4'-dimethylstyryl)-4-n-butyl-3,5-dioxopyrazolidine
1-p-tolyl-2-(3',4'-dimethylstyryl)-4-n-propyl-3,5-dioxopyrazolidine
1-p-tolyl-2-(2'-methoxy-3'-methylstyryl)-4-n-butyl-3,5-dioxopyrazolidine
1-p-tolyl-2-(2'-methoxy-3'-methylstyryl)-4-n-propyl-3,5-dioxopyrazolidine
1-p-tolyl-2-(2'-methoxy-5'-methylstyryl)-4-n-butyl-3,5-dioxopyrazolidine
1-p-tolyl-2-(2'-methoxy-5'-methylstyryl)-4-n-propyl-3,5-dioxopyrazolidine
1-p-tolyl-2-(3',4',5'-trimethoxystyryl)-4-n-butyl-3,5-dioxopyrazolidine
1-p-tolyl-2-(3',4',5'-trimethoxystyryl)-4-n-propyl-3,5-dioxopyrazolidine
1-p-chlorophenyl-2-(3',4'-methylenedioxystyryl)-4-n-butyl-3,5-dioxopyrazolidine
1-p-chlorophenyl-2-(3',4'-methylenedioxystyryl)-4-n-propyl-3,5-dioxopyrazolidine
1-p-chlorophenyl-2-(3',4'-dimethoxystyryl)-4-n-butyl-3,5-dioxopyrazolidine
1-p-chlorophenyl-2-(3',4'-dimethoxystyryl)-4-n-propyl-3,5-dioxopyrazolidine
1-p-chlorophenyl-2-(3',4'-dimethylstyryl)-4-n-butyl-3,5-dioxopyrazolidine
1-p-chlorophenyl-2-(3',4'-dimethylstyryl)-4-n-propyl-3,5-dioxopyrazolidine
1-p-chlorophenyl-2-(2'-methoxy-3'-methylstyryl)-4-n-butyl-3,5-dioxopyrazolidine
1-p-chlorophenyl-2-(2'-methoxy-3'-methylstyryl)-4-n-propyl-3,5-dioxopyrazolidine
1-p-chlorophenyl-2-(2'-methoxy-5'-methylstyryl)-4-n-butyl-3,5-dioxopyrazolidine
1-p-chlorophenyl-2-(2'-methoxy-5'-methylstyryl)-4-n-propyl-3,5-dioxopyrazolidine
1-p-chlorophenyl-2-(3',4',5'-trimethoxystyryl)-4-n-butyl-3,5-dioxopyrazolidine
1-p-chlorophenyl-2-(3',4',5'-trimethoxystyryl)-4-n-propyl-3,5-dioxopyrazolidine And further, the present invention provides a process for preparing 3,5-dioxopyrazolidine derivatives of the Formula I from $N^1,N^2$-diacyl phenylhydrazine derivatives of the Formula V, which is obtained by reacting phenyl- hydrazone derivatives of the Formula II with an organic acid of the Formula IV.

Phenylhydrazone derivatives of the Formula II may be acylated by contacting with an organic acid or its reactive derivative of the Formula IV, and the reaction is accompanied with migration of a double bond of a hydrazone type to a hydrazine type represented by the Formula V.

The suitable reactive derivatives of the organic acid include, for example, acetic acid anhydride, propionic acid anhydride, benzoic acid anhydride, acetyl chloride, acetyl bromide and the like. Acetic acid anhydride is most preferable.

This reaction progresses at a temperature within the range of 50°–140° C. preferably in the presence of a small amount of catalyst, for example, p-toluenesulfonic acid, hydrochloric acid, borontrifluoride, aluminum chloride, zinc chloride and the like. p-Toluenesulfonic acid is most preferable.

According to the above process, the following phenylhydrazine derivatives are produced.

$N_1,N_2$-diacetyl-$N_2$-styrylphenylhydrazine
$N_1,N_2$-diacetyl-$N_2$-(p-methylstyryl)phenylhydrazine
$N_1,N_2$-diacetyl-$N_2$-(p-methoxystyryl)phenylhydrazine
$N_1,N_2$-diacetyl-$N_2$-(p-chlorostyryl)phenylhydrazine
$N_1,N_2$-diacetyl-$N_2$-(o-methylstyryl)phenylhydrazine
$N_1,N_2$-diacetyl-$N_2$-(m-methylstyryl)phenylhydrazine
$N_1,N_2$-diacetyl-$N_2$-(3,4-dimethylstyryl)phenylhydrazine
$N_1,N_2$-diacetyl-$N_2$-(3,4-dimethoxystyryl)phenylhydrazine
$N_1,N_2$-diacetyl-$N_2$-(3,4-methylenedioxystyryl)phenylhydrazine
$N_1,N_2$-diacetyl-$N_2$-(2-methoxy-3-methylstyryl)phenylhydrazine
$N_1,N_2$-diacetyl-$N_2$-(2-methoxy-5-methylstyryl)phenylhydrazine
$N_1,N_2$-diacetyl-$N_2$-styryl-p-methylphenylhydrazine
$N_1,N_2$-diacetyl-$N_2$-(p-methylstyryl)-p-methylphenylhydrazine
$N_1,N_2$-diacetyl-$N_2$-(o-methylstyryl)-p-methylphenylhydrazine
$N_1,N_2$-diacetyl-$N_2$-(p-methoxystyryl)-p-methylphenylhydrazine
$N_1,N_2$-diacetyl-$N_2$-(p-chlorostyryl)-p-methylphenylhydrazine
$N_1,N_2$-diacetyl-$N_2$-(p-methylstyryl)-p-chlorophenylhydrazine
$N_1,N_2$-diacetyl-$N_2$-(o-methylstyryl)-p-chlorophenylhydrazine
$N_1,N_2$-diacetyl-$N_2$-(p-methoxystyryl)-p-chlorophenylhydrazine These products may be readily isolated from the reaction systems, but the isolation is not necessary for carrying out the next process, which reacts with a malonic acid derivative of the Formula III or its reactive derivative. 3,5-dioxopyrazolidine derivatives of the Formula I, according to this invention, may be prepared by reacting $N^1,N^2$-diacylphenylhydrazine derivatives of the Formula V with malonic acid derivatives of the Formula III or their reactive derivatives, preferably in the presence of an appropriate agent, such as sodium methoxide, sodium ethoxide, potassium ethoxide, potassium tertiary butoxide, sodium amide, potassium amide and the like. Benzene, toluene, xylene, dioxane and the like are used as solvents in these reaction. The reaction temperature is within the range of room temperature to the boiling point of the used solvent and the reaction proceeds much more smoothly in general.

After completion of reaction, the aftertreatment may be readily carried out. The reaction mixture is extracted with an appropriate solvent after acidifying with an aqueous mineral acid, and the solvent is removed to dryness, and then the desired 3,5-dioxopyrazolidine derivative may be isolated as crude product. This product is further purified, if desired, by recrystallization from a suitable solvent such as ethanol, benzene, or the like.

According to this process, there are produced the 3,5-dioxopyrazolidine derivatives mentioned above, which are prepared from hydrazone derivatives of the Formula II.

The phenyl-hydrazone derivatives of the Formula II, which are the initial starting material in this process, are prepared, for example, by reacting a corresponding carbonyl derivative of the Formula VI,

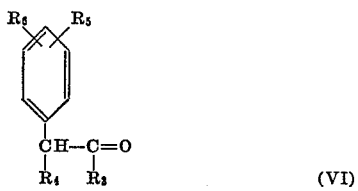

wherein $R_3$, $R_4$, $R_5$ and $R_6$ are as defined above, with a corresponding phenylhydrazine derivative of the Formula VII,

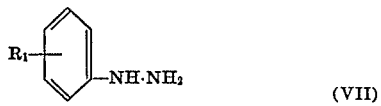

wherein $R_1$ is as defined above, or its salt.

Among these novel 3,5-dioxopyrazolidine derivatives of the present invention described before, there are a few useful compounds, which indicate not only excellent anti-inflammatory action but also possess comparatively low toxicity. The many compounds of this invention are low in toxicity, and even when over 200 mg./kg. of these compounds are orally administrated to each of rat and mouse, they scarcely show toxic symptoms and occult bleeding is negative in feces thereof. Nevertheless, the activities of these compounds are much higher than those of 1,2-diphenyl-3,5-dioxo-4-n-butylpyrazolidine (phenylbutazone) and oxyphenbutazone. Therefore, the therapeutic ratios of the compounds of the present invention are far greater than any other drugs. Therefore, these compounds are markedly valuable in practical use.

The therapeutic ratios of these compounds of the present invention, and 1,2 - diphenyl - 3,5 - dioxo-4-n-butylpyrazolidine (phenylbutazone) are given in the following table.

It has found that these compounds also have comparatively potent analgesic activities shown by Haffner's method, and antipyretic activities in a pyrogen test.

This invention is further disclosed in the following examples of preferred embodiments thereof, which are presented for purposes of illustration and are not intended to limit the scope of the invention.

EXAMPLE 1

To a solution of 3 g. of metallic sodium dissolved in 100 ml. absolute ethanol are added 15 g. of phenylacetaldehyde phenylhydrazone and a solution of 17 g. of diethyl n-amylmalonate in 150 ml. xylene. The mixture is heated at 100° C. for 3 hours and then at 140° C. for 14 hours with stirring. After cooling, the reaction mixture is poured into water on ice cooling, and acidified with aqueous hydrochloric acid. The organic layer is separated and the aqueous layer is extracted with ethylacetate. The ethylacetate layer is combined with the organic layer, washed with water, dried over sodium sulfate and evaporated under reduced pressure. The oily residue is crystallized on treatment with ethanol to give 1-phenyl-2-styryl-4-n-amyl-3,5-dioxopyrazolidine, M.P. 141°–142° C. Recrystallization from ethanol gives 13 g. of the product having M.P. 142°–143° C.

By a method similar to that mentioned above, following compounds are prepared from a corresponding phenylacetaldehyde phenylhydrazone derivative.

1-phenyl-2-styryl-4-n-butyl-3,5-dioxopyrazolidine, M.P. 166° C.

1-p-tolyl-2-styryl-4-n-butyl-3,5-dioxopyrazolidine, M.P. 138°–139° C.

1-p-chlorophenyl-2-styryl-4-n-butyl-3,5-dioxopyrazolidine, M.P. 147°–148° C.

1-phenyl-2-(3',4'-methylenedioxystyryl)-4-n-butyl-3,5-dioxopyrazolidine, M.P. 145°–146° C.

1-p-tolyl-2-(3',4'-methylenedioxystyryl)-4-n-butyl-3,5-dioxopyrazolidine, M.P. 133°–134° C.

1-p-chlorophenyl-2-(3',4'-methylenedioxystyryl)-4-n-butyl-3,5-dioxopyrazolidine, M.P. 155°–156° C.

1-phenyl-2-(p-chlorostyryl)-4-n-butyl-3,5-dioxopyrazolidine, M.P. 190° C.

1-p-tolyl-2-(p-chlorostyryl)-4-n-butyl-3,5-dioxopyrazolidine, M.P. 178°–179°C.

TABLE

| Effects | 50% inhibiting dose of carrageenin edema of rat's hind paw, per os (mg./kg.) | 50% lethal dose of rat per os (mg./kg.) | Therapeutic ratio (50% lethal dose/50% inhibiting dose of carrageenin edema) |
| --- | --- | --- | --- |
| Compound: | | | |
| 1,2-diphenyl-3,5-dioxo-4-n-butyl pyrazolidine (phenylbutazone) | 320 | ca. 600 | ca. 1.9 |
| 1-phenyl-2-styryl-4-n-butyl-3,5-dioxopyrazolidine | 125 | >500 | >4.0 |
| 1-(p-tolyl)-2-styryl-4-n-butyl-3,5-dioxopyrazolidine | 75 | >500 | >6.7 |
| 1-(p-tolyl)-2-(p-methoxystyrl)-4-n-butyl-3,5-dioxopyrazolidine | 65 | >500 | >7.7 |
| 1-(p-chlorophenyl)-2-(p-methoxystyrl)-4-n-butyl-3,5-dioxopyrazolidine | 60 | >500 | >8.3 |
| 1-(p-tolyl)-2-(2',3'-methylene dioxystyryl)-4-n-butyl-3,5-dioxopyrazolidine | 120 | >500 | >4.2 |

The present inventors prepared many other 3,5-dioxopyrazolidine derivatives than the compounds shown in the aforesaid table and evaluated the pharmaceutical effects thereof by animal tests.

The present inventors have found that many 3,5-dioxopyrazolidine derivatives of the Formula I, which are prepared by the present invention, are superior to 1,2-diphenyl-3,5-dioxo-4 - n - butylpyrazolidine (phenylbutazone) in the therapeutic ratios thereof and has a great practical value.

1-p-chlorophenyl-2-(p-chlorostyryl)-4-n-butyl-3,5-dioxopyrazolidine, M.P. 172°–173° C.

1-phenyl-2-(3',4'-dimethoxystyryl)-4-n-butyl-3,5-dioxopyrazolidine, M.P. 108°–109° C.

1-p-tolyl-2-(3',4'-dimethoxystyryl)-4-n-butyl-3,5-dioxopyrazolidine, M.P. 120°–121° C.

1-p-chlorophenyl-2-(3',4'-dimethoxystyryl)-4-n-butyl-3,5-dioxopyrazolidine, M.P. 123°–124° C.

1-phenyl-2-(o-methoxystyryl)-4-n-butyl-3,5-dioxopyrazolidine, M.P. 110°–111° C.

1-p-tolyl-2-(o-methoxystyryl)-4-n-butyl-3,5-dioxopyrazolidine, M.P. 123°–124° C.
1-p-chlorophenyl-2-(o-methoxystyryl)-4-n-butyl-3,5-dioxopyrazolidine, M.P. 128°–129° C.
1-phenyl-2-(2′-methoxy-5′-methylstyryl)-4-n-butyl-3,5-dioxopyrazolidine, M.P. 98°–99° C.
1-p-tolyl-2-(2′-methoxy-5′-methylstyryl)-4-n-butyl-3,5-dioxopyrazolidine, M.P. 114°–115° C.
1-p-chlorophenyl-2-(2′-methoxy-5′-methylstyryl)-4-n-butyl-3,5-dioxopyrazolidine, M.P. 113°–114° C.
1-phenyl-2-(p-methoxystyryl)-4-n-butyl-3,5-dioxopyrazolidine, M.P. 150°–151° C.
1-p-tolyl-2-(p-methoxystyryl)-4-n-butyl-3,5-dioxopyrazolidine, M.P. 133°–134° C.
1-p-chlorophenyl-2-(p-methoxystyryl)-4-n-butyl-3,5-dioxopyrazolidine, M.P. 127°–128° C.
1-phenyl-2-(2′-methoxy-3′-methylstyryl)-4-n-butyl-3,5-dioxopyrazolidine, M.P. 89°–90° C.
1-p-tolyl-2-(2′-methoxy-3′-methylstyryl)-4-n-butyl-3,5-dioxopyrazolidine, M.P. 107°–108° C.
1-p-chlorophenyl-2-(2′-methoxy-3′-methylstyryl)-4-n-butyl-3,5-dioxopyrazolidine, M.P. 102°–103° C.
1-phenyl-2-(p-methylstyryl)-4-n-butyl-3,5-dioxopyrazolidine, M.P. 181°–182° C.
1-p-tolyl-2-(p-methylstyryl)-4-n-butyl-3,5-dioxopyrazolidine, M.P. 162°–163° C.
1-p-chlorophenyl-2-(p-methylstyryl)-4-n-butyl-3,5-dioxopyrazolidine, M.P. 156°–157° C.
1-phenyl-2-(p-isopropylstyryl)-4-n-butyl-3,5-dioxopyrazolidine, M.P. 148°–149° C.
1-p-tolyl-2-(p-isopropylstyryl)-4-n-butyl-3,5-dioxopyrazolidine, M.P. 147°–148° C.
1-p-chlorophenyl-2-(isopropylstyryl)-4-n-butyl-3,5-dioxopyrazolidine, M.P. 137°–138° C.
1-p-tolyl-2-(α-methylstyryl)-4-n-butyl-3,5-dioxopyrazolidine
1-p-tolyl-2-(β-methylstyryl)-4-n-butyl-3,5-dioxopyrazolidine
1-p-tolyl-2-(α,β-dimethylstyryl)-4-n-butyl-3,5-dioxopyrazolidine
1-p-tolyl-2-(m-chlorostyryl)-4-n-butyl-3,5-dioxopyrazolidine
1-p-tolyl-2-(o-chlorostyryl)-4-n-butyl-3,5-dioxopyrazolidine
1-p-tolyl-2-(m-methylstyryl)-4-n-butyl-3,5-dioxopyrazolidine
1-p-tolyl-2-(o-methylstyryl)-4-n-butyl-3,5-dioxopyrazolidine
1-p-tolyl-2-(p-methylstyryl)-4-n-propyl-3,5-dioxopyrazolidine
1-p-tolyl-2-(p-methylstyryl)-4-n-pentyl-3,5-dioxopyrazolidine
1-p-tolyl-2-(p-isopropylstyryl)-4-n-propyl-3,5-dioxopyrazolidine
1-p-tolyl-2-(p-nitrostyryl)-4-n-butyl-3,5-dioxopyrazolidine
1-p-tolyl-2-(p-ethylstyryl)-4-n-butyl-3,5-dioxopyrazolidine
1-(p-chlorophenyl)-2-(α-methylstyryl)-4-n-butyl-3,5-dioxopyrazolidine
1-(p-chlorophenyl)-2-(β-methylstyryl)-4-n-butyl-3,5-dioxopyrazolidine
1-(p-chlorophenyl)-2-(α,β-dimethylstyryl)-4-n-butyl-3,5-dioxopyrazolidine
1-(p-chlorophenyl)-2-(m-chlorostyryl)-4-n-butyl-3,5-dioxopyrazolidine
1-(p-chlorophenyl)-2-(o-chlorostyryl)-4-n-butyl-3,5-dioxopyrazolidine
1-(p-chlorophenyl)-2-(m-methylstyryl)-4-n-butyl-3,5-dioxopyrazolidine
1-(p-chlorophenyl)-2-(o-methylstyryl)-4-n-butyl-3,5-dioxopyrazolidine
1-(p-chlorophenyl)-2-(p-methylstyryl)-4-n-propyl-3,5-dioxopyrazolidine
1-(p-chlorophenyl)-2-(p-methylstyryl)-4-n-pentyl-3,5-dioxopyrazolidine
1-(p-chlorophenyl)-2-(p-isopropylstyryl)-4-n-propyl-3,5-dioxopyrazolidine
1-(p-chlorophenyl)-2-(p-nitrostyryl)-4-n-butyl-3,5-dioxopyrazolidine
1-(p-chlorophenyl)-2-(p-ethylstyryl)-4-n-butyl-3,5-dioxopyrazolidine
1-(p-methoxyphenyl)-2-(α-methylstyryl)-4-n-butyl-3,5-dioxopyrazolidine
1-(p-methoxyphenyl-2-(β-methylstyryl)-4-n-butyl-3,5-dioxopyrazolidine
1-(p-methoxyphenyl)-2-(α,β-dimethylstyryl)-4-n-butyl-3,5-dioxopyrazolidine
1-(p-methoxyphenyl)-2-(m-chlorostyryl)-4-n-butyl-3,5-dioxopyrazolidine
1-(p-methoxyphenyl)-2-(o-chlorostyryl)-4-n-butyl-3,5-dioxopyrazolidine
1-(p-methoxyphenyl)-2-(m-methylstyryl)-4-n-butyl-3,5-dioxopyrazolidine
1-(p-methoxyphenyl)-2-(o-methylstyryl)-4-n-butyl-3,5-dioxopyrazolidine
1-(p-methoxyphenyl)-2-(p-methylstyryl)-4-n-propyl-3,5-dioxopyrazolidine
1-(p-methoxyphenyl)-2-(p-methylstyryl)-4-n-pentyl-3,5-dioxopyrazolidine
1-(p-methoxyphenyl)-2-(o-methoxystyryl)-4-n-butyl-3,5-dioxopyrazolidine
1-(p-methoxyphenyl)-2-(p-isopropylstyryl)-4-n-butyl-3,5-dioxopyrazolidine
1-(p-methoxyphenyl)-2-(p-nitrostyryl)-4-n-butyl-3,5-dioxopyrazolidine
1-(p-methoxyphenyl)-2-(p-ethylstyryl)-4-n-butyl-3,5-dioxopyrazolidine
1-(p-nitrophenyl)-2-(p-chlorostyryl)-4-n-butyl-3,5-dioxopyrazolidine
1-(p-nitrophenyl)-2-(p-methylstyryl)-4-n-butyl-3,5-dioxopyrazolidine
1-(p-nitrophenyl)-2-(p-methoxystyryl)-4-n-butyl-3,5-dioxopyrazolidine
1-(p-nitrophenyl)-2-(α-methylstyryl)-4-n-butyl-3,5-dioxopyrazolidine
1-(p-nitrophenyl)-2-(β-methylstyryl)-4-n-butyl-3,5-dioxopyrazolidine
1-(p-nitrophenyl)-2-(α,β-dimethylstyryl)-4-n-butyl-3,5-dioxopyrazolidine
1-(p-nitrophenyl)-2-(m-chlorostyryl)-4-n-butyl-3,5-dioxopyrazolidine
1-(p-nitrophenyl)-2-(o-chlorostyryl)-4-n-butyl-3,5-dioxopyrazolidine
1-(p-nitrophenyl)-2-(m-methylstyryl)-4-n-butyl-3,5-dioxopyrazolidine
1-(p-nitrophenyl)-2-(o-methylstyryl)-4-n-butyl-3,5-dioxopyrazolidine
1-(p-nitrophenyl)-2-(p-methylstyryl)-4-n-propyl-3,5-dioxopyrazolidine
1-(p-nitrophenyl)-2-(p-methylstyryl)-4-n-pentyl-3,5-dioxopyrazolidine
1-(p-nitrophenyl)-2-(o-methoxystyryl)-4-n-butyl-3,5-dioxopyrazolidine
1-(p-nitrophenyl)-2-(p-isopropylstyryl)-4-n-butyl-3,5-dioxopyrazolidine
1-(p-nitrophenyl)-2-(p-isopropylstyryl)-4-n-propyl-3,5-dioxopyrazolidine
1-(p-nitrophenyl)-2-(p-nitrostyryl)-4-n-butyl-3,5-dioxopyrazolidine
1-(p-nitrophenyl)-2-(p-ethylstyryl)-4-n-butyl-3,5-dioxopyrazolidine
1-phenyl-2-(3′,4′-methylenedioxystyryl)-4-n-propyl-3,5-dioxopyrazolidine
1-phenyl-2-(3′,4′-dimethoxystyryl)-4-n-propyl-3,5-dioxopyrazolidine
1-phenyl-2-(3′,4′-dimethoxystyryl)-4-n-butyl-3,5-dioxopyrazolidine 1-phenyl-2-(3',4'-dimethylstyryl)-4-n-propyl-3,5-dioxopyrazolidine
1-phenyl-2-(2'-methoxy-3'-methylstyryl)-4-n-propyl-3,5-dioxopyrazolidine
1-phenyl-2-(2'-methoxy-5'-methylstyryl)-4-n-propyl-3,5-dioxopyrazolidine
1-phenyl-2-(3',4',5'-trimethoxystyryl)-4-n-butyl-3,5-dioxopyrazolidine
1-phenyl-2-(3',4',5'-trimethoxystyryl)-4-n-propyl-3,5-dioxopyrazolidine
1-p-tolyl-2-(3',4'-methylenedioxystyryl)-4-n-propyl-3,5-dioxopyrazolidine
1-p-tolyl-2-(3',4'-dimethoxystyryl)-4-n-propyl-3,5-dioxopyrazolidine
1-p-tolyl-2-(3',4'-dimethylstyryl)-4-n-butyl-3,5-dioxopyrazolidine
1-p-tolyl-2-(3',4'-dimethylstyryl)-4-n-propyl-3,5-dioxopyrazolidine
1-p-tolyl-2-(2'-methoxy-3'-methylstyryl)-4-n-propyl-3,5-dioxopyrazolidine
1-p-tolyl-2-(2'-methoxy-5'-methylstyryl)-4-n-propyl-3,5-dioxopyrazolidine
1-p-tolyl-2-(3',4',5'-trimethoxystyryl)-4-n-butyl-3,5-dioxopyrazolidine
1-p-tolyl-2-(3',4',5'-trimethoxystyryl)-4-n-propyl-3,5-dioxopyrazolidine
1-p-chlorophenyl-2-(3',4'-methylenedioxystyryl)-4-n-propyl-3,5-dioxopyrazolidine
1-p-chlorophenyl-2-(3',4'-dimethoxystyryl)-4-n-propyl-3,5-dioxopyrazolidine
1-p-chlorophenyl-2-(3',4'-dimethylstyryl)-4-n-butyl-3,5-dioxopyrazolidine
1-p-chlorophenyl-2-(3',4'-dimethylstyryl)-4-n-propyl-3,5-dioxopyrazolidine
1-p-chlorophenyl-2-(2'-methoxy-3'-methylstyryl)-4-n-propyl-3,5-dioxopyrazolidine
1-p-chlorophenyl-2-(2'-methoxy-5'-methylstyryl)-4-n-propyl-3,5-dioxopyrazolidine
1-p-chlorophenyl-2-(3',4',5'-trimethoxystyryl)-4-n-butyl-3,5-dioxopyrazolidine
1-p-chlorophenyl-2-(3',4',5'-trimethoxystyryl)-4-n-propyl-3,5-dioxopyrazolidine.

EXAMPLE 2

A mixture of 12 g. p-chlorophenylacetaldehyde and 7.5 g. of phenyl hydrazine in 100 ml. benzene is heated at 50°–60° C. for 30 minutes. This reaction mixture is decanted to remove the resulting water and dried over sodium sulfate. The resulting solution of p-chlorophenylacetaldehyde phenylhydrazone in benzene and 15 g. of diethyl n-butylmalonate are added to a solution of 2 g. of metallic sodium in 100 ml. ethanol. The mixture is heated in 80°–90° C. with stirring to remove ethanol and benzene. After a large amount of the solvent is distilled off, 100 ml. of xylene is added to complete the reaction by heating at 140° C. for 10 hours. After cooling, the reaction mixture is poured into water and acidified with aqueous hydrochloric acid. The organic layer is separated and the aqueous layer is extracted with chloroform. The chloroform layer and the organic layer are combined and washed with water, dried over magnesium sulfate and evaporated under reduced pressure. The oily residue is crystallized from ethanol to give 1-phenyl-2-p-chlorostyryl-4-n-butyl-3,5-dioxopyrazolidine. Recrystallization from ethanol gives 10 g. of the product having M.P. 190°–191° C.

By a method similar to that mentioned above, following compounds are prepared from corresponding phenylhydrazone derivatives.

1-phenyl-2-styryl-4-n-butyl-3,5-dioxopyrazolidine, M.P. 166° C.
1-p-tolyl-2-styryl-4-n-butyl-3,5-dioxopyrazolidine, M.P. 138°–139° C.
1-p-chlorophenyl-2-styryl-4-n-butyl-3,5-dioxopyrazolidine, M.P. 147°–148° C.
1-phenyl-2-(3',4'-dimethoxystyryl)-4-n-butyl-3,5-dioxopyrazolidine, M.P. 145°–146° C.
1-p-tolyl-2-(3',4'-dimethoxystyryl)-4-n-butyl-3,5-dioxopyrazolidine, M.P. 133°–134° C.
1-p-chlorophenyl-2-(3',4'-dimethoxystyryl)-4-n-butyl-3,5-dioxopyrazolidine, M.P. 155°–156° C.
1-phenyl-2-(p-chlorostyryl)-4-n-butyl-3,5-dioxopyrazolidine, M.P. 190° C.
1-p-tolyl-2-(p-chlorostyryl)-4-n-butyl-3,5-dioxopyrazolidine, M.P. 178°–179° C.
1-p-chlorophenyl-2-(p-chlorostyryl)-4-n-butyl-3,5-dioxopyrazolidine, M.P. 172°–173° C.
1-phenyl-2-(3',4'-dimethoxystyryl)-4-n-butyl-3,5-dioxopyrazolidine, M.P. 108°–109° C.
1-p-tolyl-2-(3',4'-dimethoxystyryl)-4-n-butyl-3,5-dioxopyrazolidine, M.P. 120°–121° C.
1-p-chlorophenyl-2-(3',4'-dimethoxystyryl)-4-n-butyl-3,5-dioxopyrazolidine, M.P. 123°–124° C.
1-phenyl-2-(o-methoxystyryl)-4-n-butyl-3,5-dioxopyrazolidine, M.P. 110°–111° C.
1-p-tolyl-2-(o-methoxystyryl)-4-n-butyl 3,5-dioxopyrazolidine, M.P. 123°–124° C.
1-p-chlorophenyl-2-(o-methoxystyryl)-4-n-butyl-3,5-dioxopyrazolidine, M.P. 128°–129° C.
1-phenyl-2-(2'-methoxy-5'-methylstyryl)-4-n-butyl-3,5-dioxopyrazolidine, M.P. 98°–99° C.
1-p-tolyl-2-(2'-methoxy-5'-methlystyryl)-4-n-butyl-3,5-dioxopyrazolidine, M.P. 114°–115° C.
1-p-chlorophenyl-2-(2'-methoxy-5'-methylstyryl)-4-n-butyl-3,5-dioxopyrazolidine, M.P. 113°–114° C.
1-phenyl-2-(p-methoxystyryl)-4-n-butyl-3,5-dioxopyrazolidine, M.P. 150°–151° C.
1-p-tolyl-2-(p-methoxystyryl)-4-n-butyl-3,5-dioxopyrazolidine, M.P. 133°–134° C.
1-p-chlorophenyl-2-(p-methoxystyryl)-4-n-butyl-3,5-dioxopyrazolidine, M.P. 127°–128° C.
1-phenyl-2-(2'-methoxy-3'-methylstyryl)-4-n-butyl-3,5-dioxopyrazolidine, M.P. 89°–90° C.
1-p-tolyl-2-(2'-methoxy-3'-methylstyryl)-4-n-butyl-3,5-dioxopyrazolidine, M.P. 107°–108° C.
1-p-chlorophenyl-2-(2'-methoxy-3'-methylstyryl)-4-n-butyl-3,5-dioxopyrazolidine, M.P. 102°–103° C.
1-phenyl-2-(p-methylstyryl)-4-n-butyl-3,5-dioxopyrazolidine, M.P. 181°–182° C.
1-p-tolyl-2-(p-methylstyryl)-4-n-butyl-3,5-dioxopyrazolidine, M.P. 162°–163° C.
1-p-chlorophenyl-2-(p-methylstyryl)-4-n-butyl-3,5-dioxopyrazolidine, M.P. 156°–157° C.
1-phenyl-2-(p-isopropylstyryl)-4-n-butyl-3,5-dioxopyrazolidine, M.P. 148°–149° C.
1-p-tolyl-2-(p-isopropylstyryl)-4-n-butyl-3,5-dioxopyrazolidine, M.P. 147°–148° C.
1-p-chlorophenyl-2-(-isopropylstyryl)-4-n-butyl-3,5-dioxopyrazolidine, M.P. 137°–138° C.
1-phenyl-2-styryl-4-isobutyl-3,5-dioxopyrazolidine
1-phenyl-2-styryl-4-n-propyl-3,5-dioxopyrazolidine
1-(p-methoxyphenyl)-2-styryl-4-n-butyl-3,5-dioxopyrazolidine
1-phenyl-2-(α-methylstyryl)-4-n-butyl-3,5-dioxopyrazolidine
1-phenyl-2-(β-methylstyryl)-4-n-butyl-3,5-dioxopyrazolidine
1-phenyl-2-(α,β-dimethylstyryl)-4-n-butyl-3,5-dioxopyrazolidine
1-phenyl-2-(m-chlorostyryl)-4-n-butyl-3,5-dioxopyrazolidine
1-phenyl-2-(o-chlorostyryl)-4-n-butyl-3,5-dioxopyrazolidine
1-phenyl-2-(m-methylstyryl)-4-n-butyl-3,5-dioxopyrazolidine
1-phenyl-2-(o-methylstyryl)-4-n-butyl-3,5-dioxopyrazolidine 1-phenyl-2-(p-methylstyryl)-4-n-propyl-3,5-dioxo-
pyrazolidone
1-phenyl-2-(p-methylstyryl)-4-n-pentyl-3,5-dioxopyrazoli-
dine
1-phenyl-2-(p-isopropylstyryl)-4-n-propyl-3,5-dioxo-
pyrazolidine
1-phenyl-2-(p-nitrostyryl)-4-n-butyl-3,5-dioxopyrazoli-
dine
1-phenyl-2-(p-ethylstyryl)-4-n-butyl-3,5-dioxopyrazolidine

EXAMPLE 3

Step A

A mixture of 15 g. of phenylacetaldehyde phenylhydrazone and 0.6 g. of p-toluenesulfonic acid in 100 g. of acetic anhydride is refluxed for 1 hour. After cooling, 0.3 g. of sodium acetate is added to the reaction mixture, which is condensed under reduced pressure. The oily residue which is dissolved in 100 ml. of benzene is washed with water and dried over sodium sulfate. This benzene solution of $N_1,N_2$-diacetyl-$N_2$-styrylphenylhydrazine is used in the next reaction.

Step B

To a solution of 2 g. of metallic sodium in 100 ml. of ethanol are added the solution of $N_1,N_2$-diacetyl $N_2$-styrylphenylhydrazine in benzene and 14 g. n-butyldiethylmalonate. To the mixture is added 100 ml. of xylene at 140° C. for 10 hours to remove benzene and methanol. After cooled, the reaction mixture is poured into water and acidified. The organic layer is separated and the aqueous layer is extracted with chloroform. The combined organic layer is washed with water and dried over sodium sulfate. The residue is crystallized on treatment with ethanol to give 7.5 g. of 1-phenyl-2-styryl-4-n-butyl-3,5-dioxopyrazolidine, M.P. 166° C.

By the method similar to that mentioned in Example 3, following compounds are obtained from corresponding phenylhydrazone derivatives.

1-phenyl-2-styryl-4-n-butyl-3,5-dioxopyrazolidine, M.P. 166° C.
1-p-tolyl-2-styryl-4-n-butyl-3,5-dioxopyrazolidine, M.P. 138°–139° C.
1-p-chlorophenyl-2-styryl-4-n-butyl-3,5-dioxopyrazolidine, M.P. 147°–148° C.
1-phenyl-2-(3',4'-dimethoxystyryl)-4-n-butyl-3,5-dioxopyrazolidine, M.P. 145°–146° C.
1-p-tolyl-2-(3',4'-dimethoxystyryl)-4-n-butyl-3,5-dioxopyrazolidine, M.P. 133–134° C.
1-p-chlorophenyl-2-(3',4'-dimethoxystyryl)-4-n-butyl-3,5-dioxopyrazolidine, M.P. 155°–156° C.
1-phenyl-2-(p-chlorostyryl)-4-n-butyl-3,5-dioxopyrazolidine, M.P. 190° C.
1-p-tolyl-2-(p-chlorostyryl)-4-n-butyl-3,5-dioxopyrazolidine, M.P. 178°–179° C.
1-p-chlorophenyl-2-(p-chlorostyryl)-4-n-butyl-3,5-dioxopyrazolidine, M.P. 172°–173° C.
1-phenyl-2-(3',4'-dimethoxystyryl)-4-n-butyl-3,5-dioxopyrazolidine, M.P. 108°–109° C.
1-p-tolyl-2-(3',4'-dimethoxystyryl)-4-n-butyl-3,5-dioxopyrazolidine, M.P. 120°–121° C.
1-p-chlorophenyl-2-(3',4'-dimethoxystyryl)-4-n-butyl-3,5-dioxopyrazolidine, M.P. 123°–124° C.
1-phenyl-2-(o-methoxystyryl)-4-n-butyl-3,5-dioxopyrazolidine, M.P. 110°–111° C.
1-p-tolyl-2-(o-methoxystyryl)-4-n-butyl-3,5-dioxopyrazolidine, M.P. 123°–124° C.
1-p-chlorophenyl-2-(o-methoxystyryl)-4-n-butyl-3,5-dioxopyrazolidine, M.P. 128°–129° C.
1-phenyl-2-(2'-methoxy-5'-methylstyryl)-4-n-butyl-3,5-dioxopyrazolidine, M.P. 98°–99° C.
1-p-tolyl-2-(2-methoxy-5-methylstyryl)-4-n-butyl-3,5-dioxopyrazolidine, M.P. 114°–115° C.
1-p-chlorophenyl-2-(2-methoxy-5-methylstyryl)-4-n-butyl-3,5-dioxopyrazolidine, M.P. 113°–114° C.
1-phenyl-2-(p-methoxystyryl)-4-n-butyl-3,5-dioxopyrazolidine, M.P. 150°–151° C.
1-p-tolyl-2-(p-methoxystyryl)-4-n-butyl-3,5-dioxopyrazolidine, M.P. 133°–134° C.
1-p-chlorophenyl-2-(p-methoxystyryl)-4-n-butyl-3,5-dioxopyrazolidine, M.P. 127°–128° C.
1-phenyl-2-(2'-methoxy-3'-methylstyryl)-4-n-butyl-3,5-dioxopyrazolidine, M.P. 89°–90° C.
1-p-tolyl-2-(2'-methoxy-3'-methylstyryl)-4-n-butyl-3,5-dioxopyrazolidine, M.P. 107°–108° C.
1-p-chlorophenyl-2-(2'-methoxy-3'-methylstyryl)-4-n-butyl-3,5-dioxopyrazolidine, M.P. 102°–103° C.
1-phenyl-2-(p-methylstyryl)-4-n-butyl-3,5-dioxopyrazolidine, M.P. 181°–182° C.
1-p-tolyl-2-(p-methylstyryl)-4-n-butyl-3,5-dioxopyrazolidine, M.P. 162°–163° C.
1-p-chlorophenyl-2-(p-methylstyryl)-4-n-butyl-3,5-dioxopyrazolidine, M.P. 156°–157° C.
1-phenyl-2-(p-isopropylstyryl)-4-n-butyl-3,5-dioxopyrazolidine, M.P. 148°–149° C.
1-p-tolyl-2-(p-isopropylstyryl)-4-n-butyl-3,5-dioxopyrazolidine, M.P. 147°–148° C.
1-p-chlorophenyl-2-(isopropylstyryl)-4-n-butyl-3,5-dioxopyrazolidine, M.P. 137°–138° C.
1-phenyl-2-($\alpha$-methylstyryl)-4-n-butyl-3,5-dioxopyrazolidine
1-phenyl-2-($\beta$-methylstyryl)-4-n-butyl-dioxopyrazolidine
1-phenyl-2-($\alpha,\beta$-dimethylstyryl)-4-n-butyl-3,5-dioxopyrazolidine
1-phenyl-2-(m-chlorostyryl)-4-n-butyl-3,5-dioxopyrazolidine
1-phenyl-2-(o-chlorostyryl)-4-n-butyl-3,5-dioxopyrazolidine
1-phenyl-2-(m-methylstyryl)-4-n-butyl-3,5-dioxopyrazolidine
1-phenyl-2-(o-methylstyryl)-4-n-butyl-3,5-dioxopyrazolidine
1-phenyl-2-(p-methylstyryl)-4-n-propyl-3,5-dioxopyrazolidine
1-phenyl-2-(p-methylstyryl)-4-n-pentyl-3,5-dioxopyrazolidine
1-phenyl-2-(p-isopropylstyryl)-4-n-propyl-3,5-dioxopyrazolidine
1-phenyl-2-(p-nitrostyryl)-4-n-butyl-3,5-dioxopyrazolidine
1-phenyl-2-(p-ethylstyryl)-4-n-butyl-3,5-dioxopyrazolidine
1-p-tolyl-2-($\alpha$-methylstyryl)-4-n-butyl-3,5-dioxopyrazolidine
1-p-tolyl-2-($\beta$-methylstyryl)-4-n-butyl-3,5-dioxopyrazolidine
1-p-tolyl-2-($\alpha,\beta$-dimethylstyryl)-4-n-butyl-3,5-dioxopyrazolidine
1-p-tolyl-2-(m-chlorostyryl)-4-n-butyl-3,5-dioxopyrazolidine
1-p-tolyl-2-(o-chlorostyryl)-4-n-butyl-3,5-dioxopyrazolidine
1-p-tolyl-2-(m-methylstyryl)-4-n-butyl-3,5-dioxopyrazolidine
1-p-tolyl-2-(m-methylstyryl)-4-n-butyl-3,5-dioxopyrazolidine
1-p-tolyl-2-(p-methylstyryl)-4-n-propyl-3,5-dioxopyrazolidine
1-p-tolyl-2-(p-methylstyryl)-4-n-pentyl-3,5-dioxopyrazolidine
1-(p-methoxyphenyl)-2-(p-chlorostyryl)-4-n-butyl-3,5-dioxopyrazolidine
1-(p-methoxyphenyl)-2-(p-methylstyryl)-4-n-butyl-3,5-dioxopyrazolidine
1-(p-methoxyphenyl)-2-(p-methoxystyryl)-4-n-butyl-3,5-dioxopyrazolidine
1-(p-methoxyphenyl)-2-($\alpha$-methylstyryl)-4-n-butyl-3,5-dioxopyrazolidine 1-(p-methoxyphenyl)-2-(β-methylstyryl)-4-n-butyl-3,5-dioxopyrazolidine
1-(p-methoxyphenyl)-2-(α,β-dimethylstyryl)-4-n-butyl-3,5-dioxopyrazolidine
1-(p-methoxyphenyl)-2-(m-chlorostyryl)-4-n-butyl-3,5-dioxopyrazolidine
1-(p-methoxyphenyl)-2-(o-chlorostyryl)-4-n-butyl-3,5-dioxopyrazolidine
1-(p-methoxyphenyl)-2-(m-methylstyryl)-4-n-butyl-3,5-dioxopyrazolidine
1-(p-methoxyphenyl)-2-(o-methylstyryl)-4-n-butyl-3,5-dioxopyrazolidine
1-(p-methoxyphenyl)-2-(p-methylstyryl)-4-n-propyl-3,5-dioxopyrazolidine
1-(p-methoxyphenyl)-2-(p-methylstyryl)-4-n-pentyl-3,5-dioxopyrazolidine
1-(p-methoxyphenyl)-2-(o-methoxystyryl)-4-n-butyl-3,5-dioxopyrazolidine
1-(p-methoxyphenyl)-2-(p-isopropylstyryl)-4-n-butyl-3,5-dioxopyrazolidine
1-(p-methoxyphenyl)-2-(p-isopropylstyryl)-4-n-propyl-3,5-dioxopyrazolidine
1-(p-methoxyphenyl)-2-(p-nitrostyryl)-4-n-butyl-3,5-dioxopyrazolidine
1-(p-methoxyphenyl)-2-(p-ethylstyryl)-4-n-butyl-3,5-dioxopyrazolidine
1-(p-chlorophenyl)-2-(α-methylstyryl)-4-n-butyl-3,5-dioxopyrazolidine
1-(p-chlorophenyl)-2-(β-methylstyryl)-4-n-butyl-3,5-dioxopyrazolidine
1-(p-chlorophenyl)-2-(α,β-dimethylstyryl)-4-n-butyl-3,5-dioxopyrazolidine
1-(p-chlorophenyl)-2-(m-chlorostyryl)-4-n-butyl-3,5-dioxopyrazolidine
1-(p-chlorophenyl)-2-(o-chlorostyryl)-4-n-butyl-3,5-dioxopyrazolidine
1-(p-chlorophenyl)-2-(m-methylstyryl)-4-n-butyl-3,5-dioxopyrazolidine
1-(p-chlorophenyl)-2-(o-methylstyryl)-4-n-butyl-3,5-dioxopyrazolidine
1-(p-chlorophenyl)-2-(p-methylstyryl)-4-n-propyl-3,5-dioxopyrazolidine
1-(p-chlorophenyl)-2-(p-methylstyryl)-4-n-pentyl-3,5-dioxopyrazolidine

What is claimed is:
1. A process for preparing 3,5-dioxopyrazolidine derivatives represented by the formula,

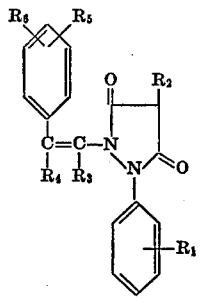

wherein $R_1$ signifies a hydrogen atom, a halogen atom, a nitro group, a lower alkyl group, a lower alkoxy group; $R_2$ signifies an alkyl group having up to 6 carbon atoms; $R_3$ and $R_4$ each signifies a hydrogen atom, a lower alkyl group, a phenyl group or a halogen-, $C_1$-$C_3$ alkyl- or $C_1$-$C_3$ alkoxy-substituted benzene group; $R_5$ and $R_6$ each signifies a hydrogen atom, a halogen atom, a nitro group, a lower alkyl group, a lower alkoxy group, a trifluoromethyl group, or a $C_1$-$C_3$ alkyl-substituted amino group; provided that $R_5$ and $R_6$ may form optionally methylenedioxy or ethylenedioxy together with the adjacent phenyl group, which process comprises reacting in the presence of a base selected from the group consisting of alkali metal alcoholates, alkali metal amides and alkali metal hydroxides and in the absence of a solvent or in the presence of a solvent selected from the group consisting of benzene, toluene, xylene and dioxane at a temperature from 80° to 150° a phenylhydrazone derivative represented by the formula,

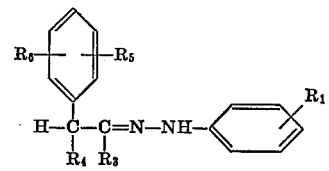

wherein $R_1$, $R_3$, $R_4$, $R_5$ and $R_6$ are as defined above with a malonic acid derivative represented by the formula,

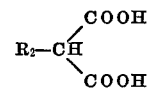

wherein $R_2$ is as defined above, or its $C_1$-$C_3$ alkyl ester, its acid chloride or bromide or mixed acid anhydride with a $C_1$-$C_3$ fatty acid.

2. 1 - (p - tolyl) - 2 - (2',3' - methylenedioxystyryl)-4-n-butyl-3,5-dioxopyrazolidine.

3. A pyrazole derivatives of the formula:

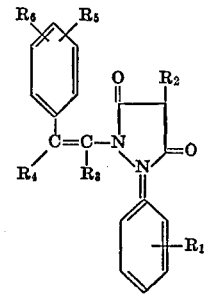

wherein $R_1$ signifies a hydrogen atom, a halogen atom, a nitro group, a lower alkyl group, a lower alkoxy group; $R_2$ signifies an alkyl group having up to 6 carbon atoms; $R_3$ and $R_4$ each signifies a hydrogen atom, a lower alkyl group, a phenyl group or a halogen-, $C_1$-$C_3$ alkyl- or $C_1$-$C_3$ alkoxy-substituted benzene group; $R_5$ and $R_6$ form methylenedioxy or ethylenedioxy together with the adjacent phenyl group.

References Cited
UNITED STATES PATENTS
3,547,916   12/1970   Schatz et al. _____ 260—240 D FOREIGN PATENTS
732,820   6/1955   England _____ 260—310 B OTHER REFERENCES
Yamamoto et al.: Journal of Med. Chem., vol. 13, pp. 292 to 295 (1970).
Wiley et al.: Pyrazolones, Pyrazolidones and Derivatives, p. 488 (references) added, Interscience Publishers, N.Y. (1964).

JOHN D. RANDOLPH, Primary Examiner

U.S. Cl. X.R.
260—310 A, 340.3, 340.5, 562 H, 566 B